(12) United States Patent
Lau Caruso et al.

(10) Patent No.: US 12,268,187 B2
(45) Date of Patent: Apr. 8, 2025

(54) OPERATING AN AUTOMATED AND ADAPTIVE ANIMAL BEHAVIORAL TRAINING SYSTEM USING MACHINE LEARNING

(71) Applicant: INTERNATIONAL BUSINESS MACHINES CORPORATION, Armonk, NY (US)

(72) Inventors: Jenna Lau Caruso, Holland Landing (CA); Samaya Madhavan, Euless, TX (US); Stephen Haertel, Ajax (CA); Geetha Kola, Bangalore (IN); Laura Jane Bennett, Alameda, CA (US); Lior Aronovich, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 17/647,063

(22) Filed: Jan. 5, 2022

(65) Prior Publication Data
US 2023/0225290 A1 Jul. 20, 2023

(51) Int. Cl.
*A01K 15/02* (2006.01)
*G06N 20/00* (2019.01)

(52) U.S. Cl.
CPC .......... *A01K 15/021* (2013.01); *G06N 20/00* (2019.01)

(58) Field of Classification Search
CPC ....... A01K 15/021; A01K 15/02; G06N 20/00
See application file for complete search history.

(56) References Cited

U.S. PATENT DOCUMENTS

| 5,351,653 | A | 10/1994 | Marischen |
| 6,944,421 | B2 | 9/2005 | Axelrod |
| 10,136,619 | B2 * | 11/2018 | Pradeep ............ A01K 15/021 |
| 10,575,497 | B2 | 3/2020 | Torres |
| 10,959,398 | B1 * | 3/2021 | Betts-Lacroix ...... G06V 10/143 |
| 11,307,728 | B1 * | 4/2022 | Rettedal ............ G06F 3/0482 |

(Continued)

FOREIGN PATENT DOCUMENTS

| CN | 106857301 A | 6/2017 |
| CN | 110352866 A | 10/2019 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Magdalena Topolski
*Assistant Examiner* — Alanna K Peterson
(74) *Attorney, Agent, or Firm* — Yee & Associates, P.C.

(57) ABSTRACT

A computer-implemented system and method operate an automatic and adaptive animal behavioral system. The system receives user configuration and feedback, and generates a training set based on online animal behavior patterns and received user feedback. The system trains one or multiple models based on the training set, if the training set is sufficiently large. It then validates the models, and provides system generated classifications and action types and levels for animal's behavior patterns, if the models' accuracy rate is above a threshold.

20 Claims, 11 Drawing Sheets

(56) References Cited

U.S. PATENT DOCUMENTS

| | | | |
|---|---|---|---|
| 11,576,348 B2* | 2/2023 | Honchariw | A01K 15/021 |
| 2010/0242859 A1 | 9/2010 | Raymond | |
| 2014/0083364 A1* | 3/2014 | Anderson | A01K 15/02 119/51.01 |
| 2017/0196196 A1* | 7/2017 | Trottier | A01K 15/027 |
| 2017/0208778 A1 | 7/2017 | Menkes | |
| 2018/0160652 A1 | 6/2018 | Torres | |
| 2018/0279921 A1 | 10/2018 | Datta | |
| 2019/0174718 A1* | 6/2019 | Venkat | A01K 5/0233 |
| 2020/0045932 A1* | 2/2020 | Knight | G01S 13/878 |
| 2020/0267936 A1* | 8/2020 | Tran | A01K 29/005 |
| 2020/0352136 A1* | 11/2020 | Hanson | A01K 15/021 |
| 2020/0404886 A1* | 12/2020 | Gibbs | A01K 27/009 |
| 2022/0104464 A1* | 4/2022 | Wernimont | H04Q 9/00 |
| 2023/0143669 A1* | 5/2023 | O'Dwyer | A01K 29/00 340/573.3 |
| 2023/0360441 A1* | 11/2023 | Kumar | G06V 40/20 |

FOREIGN PATENT DOCUMENTS

| | | | | |
|---|---|---|---|---|
| CN | 111597942 A | * | 8/2020 | A01K 15/02 |
| WO | 2011032055 A2 | | 3/2011 | |

OTHER PUBLICATIONS

Aich, S.; Chakraborty, S.; Sim, J.-S .; Jang, D.-J .; Kim, H.-C. The Design of an Automated System for the Analysis of the Activity and Emotional Patterns of Dogs with Wearable Sensors Using Machine Learning. Appl. Sci. 2019, 9, 4938. https://doi.org/10.3390/app9224938.

Bak, Ji Hyun & Choi, Jung & Akrami, Athena & Witten, llana & Pillow, Jonathan. (2016). Adaptive optimal training of animal behavior. https://pillowlab.princeton.edu/pubs/Bak16_NIPS_Adaptive Training.pdf.

Bluefang Smartphone Controlled 5-in-1 Training Dog, by High Tech Pet, Wayfair, https://www.wayfair.ca/pet/pdp/high-tech-pet-bluefang-smartphone-controlled-5-in-1-training-dog-collar-htq10024. html?piid=. Retrieved from internet on Oct. 18, 2021.

Debra Horwitz, "Using Reinforcement and Rewards to Train Your Pet," VCA, https://vcahospitals.com/know-your-pet/using-reinforcement-and-rewards-to-train-your-pet. Retrieved from internet on Dec. 23, 2020.

Indoor Boundary System, Dogwatch, https://www.dogwatch.com/products/indoor-hidden-pet-boundaries/. Retrieved from internet on Oct. 18, 2021.

Kim, Y.; Sa, J.; Chung, Y.; Park, D.; Lee, S. Resource-Efficient Pet Dog Sound Events Classification Using LSTM-FCN Based on Time-Series Data. Sensors 2018, 18, 4019. https://doi.org/10.3390/s18114019.

Method and Apparatus for Customizable Composite Behavioral Recognition and Emotional States Mapping, IPCOM000246323D, ip.com, Published May 30, 2016, https://priorart.ip.com/IPCOM/000246323.

Michael Wang and Noemie Guerin, "Autonomous Dog Training with Companion," TensorFlow Blog, Jan. 15, 2020, https://blog.tensorflow.org/2020/01/autonomous-dog-training-with-companion. html. Retrieved from internet on Dec. 23, 2020.

Operant Conditioning Chamber, Wikipedia, https://en.wikipedia.org/wiki/Operant_conditioning_chamber. Retrieved from internet on Oct. 18, 2021.

PetSafe Smart Dog Training Collar—Uses Smartphone as Handheld Remote Control—Tone, Vibration, 1-15 Levels of Static Stimulation—Bluetooth Wireless System—All in One Pet Training Solution, Amazon, https://www.amazon.com/PetSafe-Smart-Bluetooth-Training-Collar/dp/B01K73MUTI. Retrieved on Oct. 18, 2021.

SyncUP PETS App, T-mobile, https://www.t-mobile.com/devices/syncup-pets-gps-tracker-for-pet-collar. Retrieved from internet on Oct. 18, 2021.

Wernimont, S.M.; Thompson, R.J.; Mickelsen, S.L.; Smith, S.C.; Alvarenga, I.C.; Gross, K.L. Use of Accelerometer Activity Monitors to Detect Changes in Pruritic Behaviors: Interim Clinical Data on 6 Dogs. Sensors 2018, 18, 249. https://doi.org/10.3390/s18010249.

* cited by examiner

OPERATING AN AUTOMATED AND ADAPTIVE ANIMAL BEHAVIORAL TRAINING SYSTEM USING MACHINE LEARNING

BACKGROUND

Disclosed herein is a system and related method for automated and adaptive animal behavioral training using machine learning (ML).

Training an animal such as a pet improves an owner's life in addition to the life of the animal itself. Yet, animal training can be difficult, especially if it is the owner's first one. Pet animals, such as dogs, may have certain problematic tendencies, such as jumping to greet a person, barking, digging, and chewing. It is beneficial that owners teach their pets important skills that enable them to live harmoniously in a human household. Many owners do not like to, or are unable to, keep pets outside. Therefore, it is desirable to provide discipline training early in a pet's life to establish rules and boundaries. In addition to a pet use case, large open natural areas with animals are often monitored for animal behavior. Examples of these situations include farms, ranches, and national parks, where certain animal populations are controlled. In all of these cases, animal behavior is important to those responsible for maintaining a desired balance of healthy animals who behave in predictable ways.

SUMMARY

According to one aspect disclosed herein, a computer-implemented method is provided for automatic animal behavior training, comprising, using a computer processor, receiving user configuration information and user feedback information from a user regarding a specific animal, receiving input from sensors for the specific animal, and determining a mapping between the input and a set of positive and negative training actions to apply for the animal.

A system comprising a processor and a memory are also provided to implement the method, as is a computer program product that contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
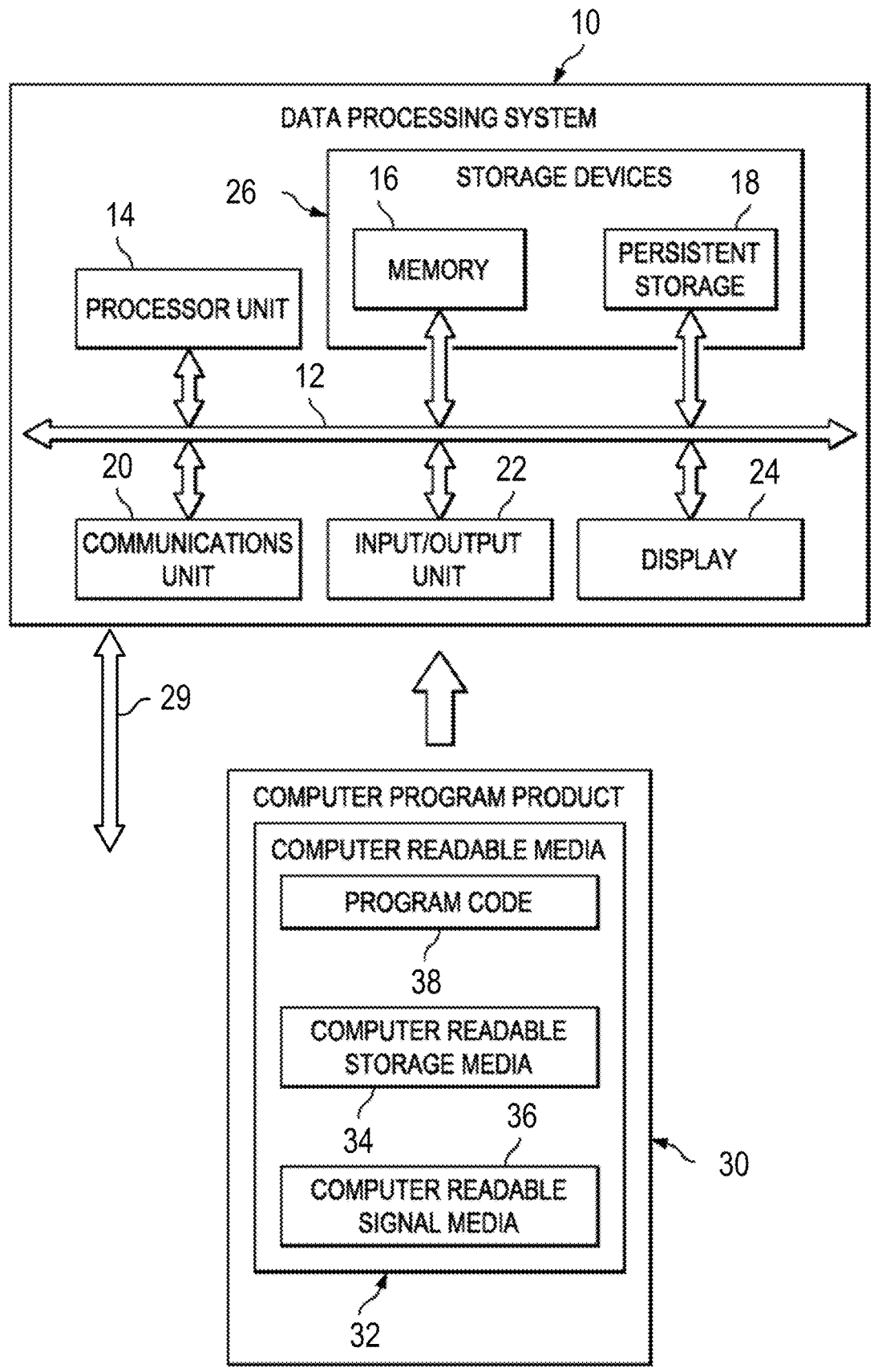
FIG. 1A is a block diagram of a data processing system (DPS) according to one or more embodiments disclosed herein.

The following general acronyms may be used below:
API application program interface
ARM advanced RISC machine
CD-ROM compact disc ROM
CPU central processing unit
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network
Table 1
General Acronyms
Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
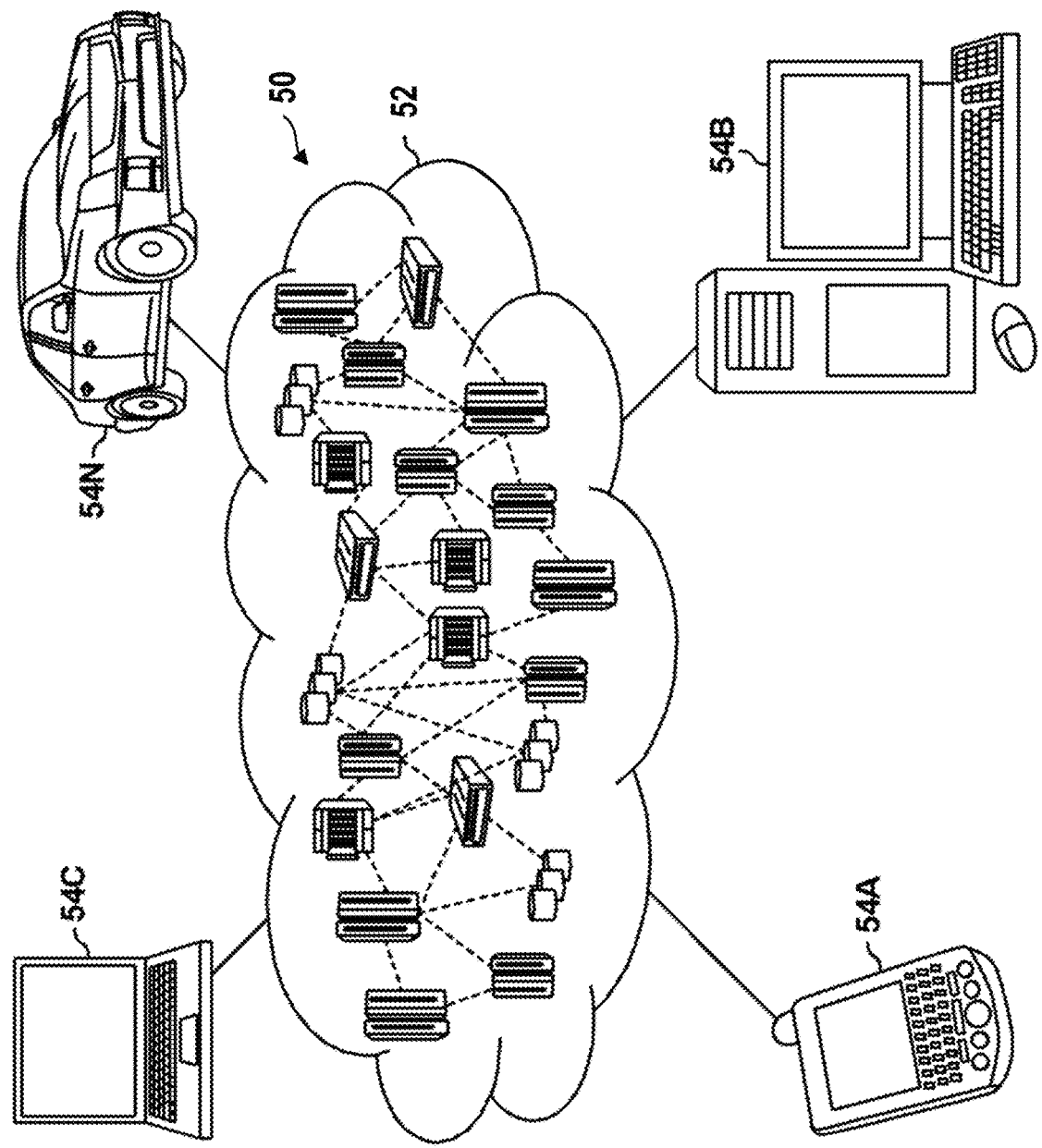
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
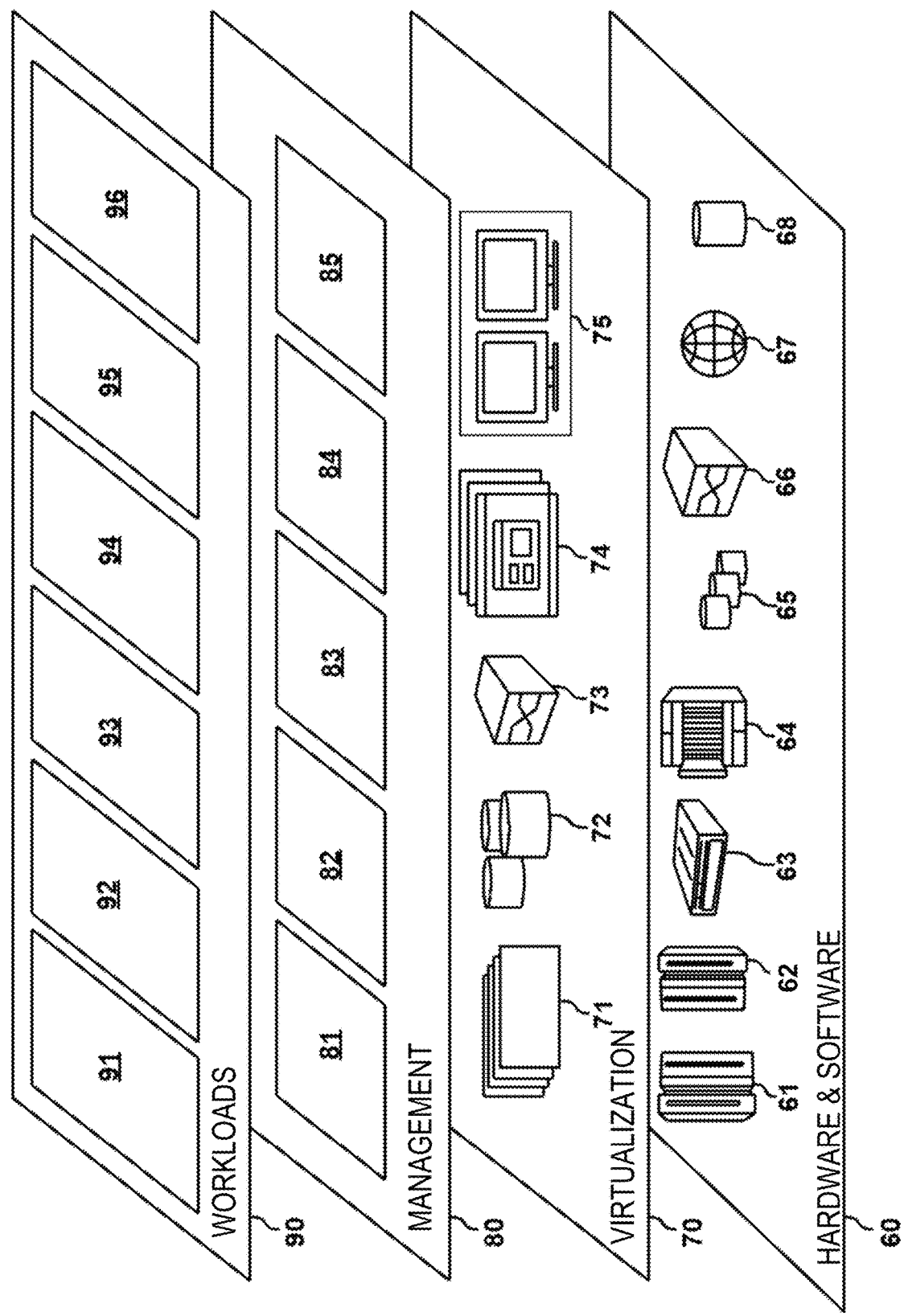
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Neural Networks

Figure 1D:
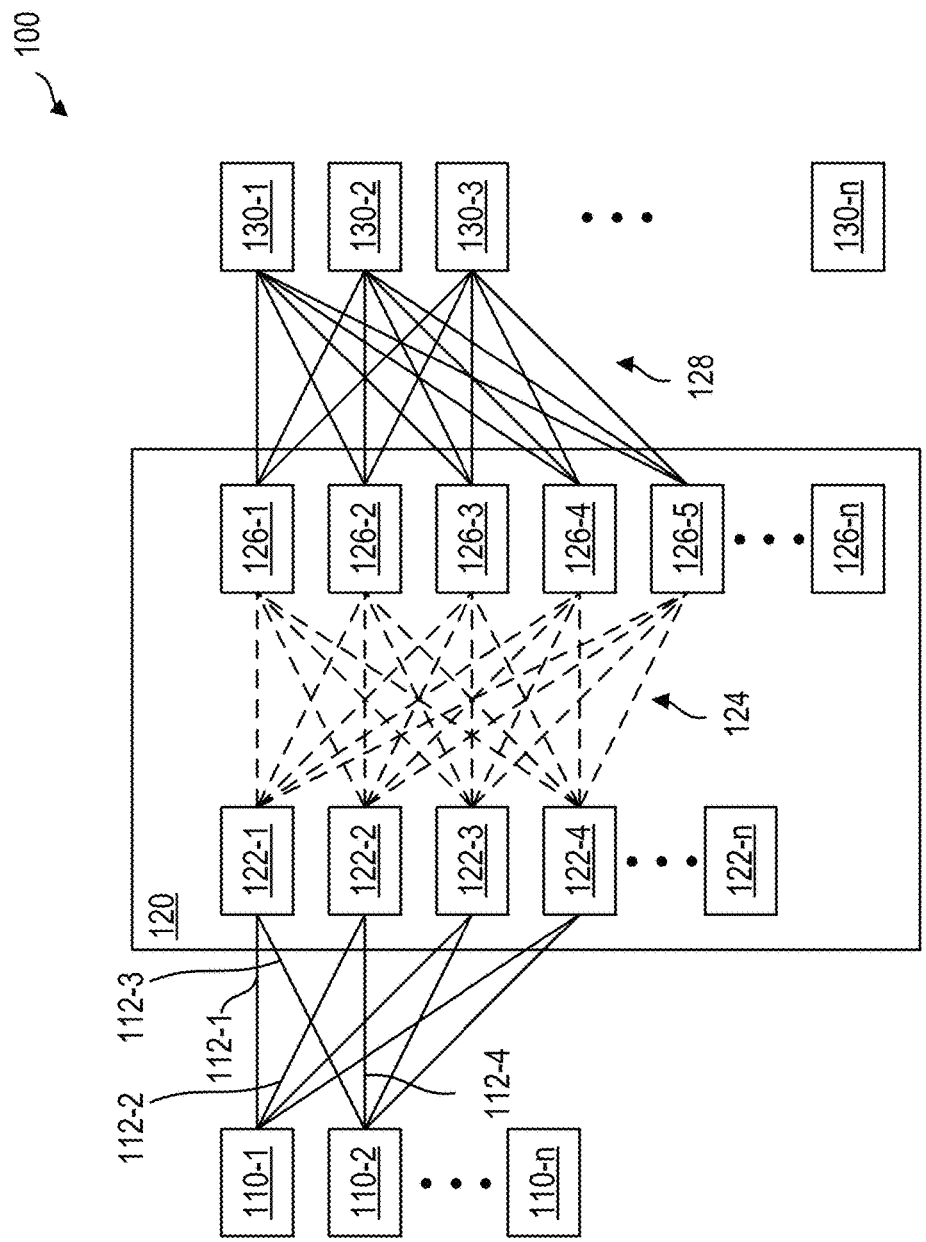
FIG. 1D is a block diagram illustrating a classifying neural network, according to one or more embodiments disclosed herein.

FIG. 1D depicts an example neural network (NN) 100 representative of one or more artificial NNs, consistent with various embodiments of the present disclosure. The NN 100 is made up of a plurality of layers. The network 100 includes an input layer 110 (the input layer 110 refers to the input neurons 110-1, 110-2, 110-3, 110-4, . . . , 110-$n$ that collectively comprise it; also the input neurons may be referred to generically as 110-$x$), a hidden section 120, and an output layer 130 (the output layer 130 refers to the output neurons 130-1, 130-2, 130-3, . . . , 130-$n$ that collectively comprise it; also the input neurons may be referred to generically as 130-$x$)). Though network 100 depicts a feed-forward NN, other NNs layouts may also be utilized, such as a recurrent NN layout (not depicted). In some embodiments, the NN 100 may be a design-and-run NN and the layout depicted may be created by a computer programmer. In some embodiments, the NN 100 may be a design-by-run NN, and the layout depicted may be generated by the input of data and by the process of analyzing that data according to one or more defined heuristics. The NN 100 may operate in a forward propagation by receiving an input and outputting a result of the input. The NN 100 may adjust the values of various components of the NN by a backward propagation (back propagation).

The input layer 110 includes a series of input neurons 110-1, 110-2, up to 110-$n$ (collectively, 110) and a series of input connections 112-1, 112-2, 112-3, 112-4, etc. (collectively, 112). The input layer 110 represents the input from data that the NN is supposed to analyze. Each input neuron 110 may represent a subset of the input data. For example, the NN 100 may be provided with a series of values from a data source, and the series of values may be represented by, e.g., a series of floating-point numbers.

In another example, by way of illustration only, the input neuron 110-1 may be the first pixel of a picture, input neuron 110-2 may be the second pixel of the picture, etc. The number of input neurons 110 may correspond to the size of the input. For example, when the NN 100 is designed to analyze images that are 256 pixels by 256 pixels, the NN layout may include a series of 65,536 input neurons. The number of input neurons 110 may correspond to the type of input. For example, when the input is a color image that is 256 pixels by 256 pixels, the NN layout may include a series of 196,608 input neurons (65,536 input neurons for each of the red, green, and blue values of each pixel). The type of input neurons 110 may correspond to the type of input. In a first example, an NN may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, an NN may be designed to analyze images that are color, and each of the input neurons may be a three-dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 112 represent the output of the input neurons 110 to the hidden section 120. Each of the input connections 112 varies depending on the value of each input neuron 110-$x$ and based upon a plurality of weights (not depicted). For example, the first input connection 112-1 has a value that is provided to the hidden section 120 based on the input neuron 110-1 and a first weight. Continuing the example, the second input connection 112-2 has a value that is provided to the hidden section 120 based on the input neuron 110-1 and a second weight. Further continuing the example, the third input connection 112-3 based on the input neuron 110-2 and a third weight, etc. Alternatively stated, the input connections 112-1 and 112-2 share the same output component of input neuron 110-1 and the input connections 112-3 and 112-4 share the same output component of input neuron 110-2; all four input connections 112-1, 112-2, 112-3, and 112-4 may have output components of four different weights. Though the NN 100 may have different weightings for each connection 112, some embodiments may contemplate weights that are similar. In some embodiments, each of the values of the input neurons 110 and the connections 112 may be stored in memory.

The hidden section 120 includes one or more layers that receive inputs and produce outputs. The hidden section 120 may include a first hidden layer of calculation neurons 122-1, 122-2, 122-3, 122-4, up to 122-$n$ (collectively, 122); a second hidden layer of calculation neurons 126-1, 126-2, 126-3, 126-4, 126-5, up to 126-$n$ (collectively 126); and a series of hidden connections 124 coupling the first hidden layer 122 and the second hidden layer 126. The NN 100 only depicts one of many NNs consistent with some embodiments of the disclosure. Consequently, the hidden section 120 may be configured with more or fewer hidden layers, which may, in some cases extend to hundreds or more-two hidden layers are depicted for example purposes.

The first hidden layer includes the calculation neurons 122-1, 122-2, 122-3, 122-4, up to 122-$n$. Each calculation neuron 122-$x$ of the first hidden layer 122 may receive as input one or more of the connections 112-$x$. For example, calculation neuron 122-1 receives input connection 112-1 and input connection 112-2. Each calculation neuron 122-$x$ of the first hidden layer 112 also provides an output. The output is represented by the dotted lines of hidden connections 124 flowing out of the first hidden layer 122. Each of the calculation neurons 122-$x$ performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, a number between −0.5 and 0.5, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 122-x also contains a bias (not depicted). The bias may be used to decide the likelihood or valuation of a given activation function. In some embodiments, each of the values of the biases for each of the calculation neurons is stored in memory.

The NN 100 may include the use of a sigmoid neuron for the activation function of a calculation neuron 122-1. An equation (Equation 1, stated below) may represent the activation function of calculation neuron 110-1 as f (neuron). The logic of calculation neuron 122-1 may be the summation of each of the input connections that feed into calculation neuron 122-1 (i.e., input connection 112-1 and input connection 112-3) which are represented in Equation 1 as j. For each j, the weight w is multiplied by the value x of the given connected input neuron 110. The bias of the calculation neuron 122-1 is represented as b. Once each input connection j is summed the bias b is subtracted. Finalizing the operations of this example as follows: given a larger positive number of results from the summation and bias in activation f (neuron), the output of calculation neuron 122-1 approaches approximately 1; given a larger negative number of results from the summation and bias in activation f (neuron), the output of calculation neuron 122-1 approaches approximately 0; and given a number somewhere in between a larger positive number and a larger negative number of results from the summation and bias in activation f (neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer 126 includes the calculation neurons 126-1, 126-2, 126-3, 126-4, 126-5, up to 126-n. In some embodiments, the calculation neurons 126-x of the second hidden layer 126 may operate similarly to the calculation neurons 122-x of the first hidden layer. For example, the calculation neurons 126-1 to 126-n may each operate with a similar activation function as the calculation neurons 122-1 to 122-n. In some embodiments, the calculation neurons 126-x of the second hidden layer may operate differently to the calculation neurons 122-x of the first hidden layer 122. For example, the calculation neurons 126-1 to 126-n may have a first activation function, and the calculation neurons 122-1 to 122-n may have a second activation function.

Similarly, the connectivity to, from, and between the various layers of the hidden section 120 may also vary. For example, the input connections 112-x may be fully connected to the first hidden layer and hidden connections 124-x may be fully connected from the first hidden layer 122 to the second hidden layer 126. In some embodiments, fully connected means that each neuron of a given layer may be connected to all the neurons of a previous layer. In some embodiments, fully connected means that each neuron of a given layer may function completely independently and may not share any connections. In a second example, the input connections 112-x may not be fully connected to the first hidden layer and the hidden connections 124-x may not be fully connected from the first hidden layer to the second hidden layer 126.

Further, the parameters to, from, and between the various layers of the hidden section 120 may also vary. In some embodiments, the parameters may include the weights and the biases. In some embodiments, there may be more or fewer parameters than the weights and biases. For purposes of example, NN 100 may be in the form of a convolutional NN or convolution NN. The convolutional NN may include a sequence of heterogeneous layers (e.g., an input layer 110, a convolution layer 122, a pooling layer 126, and an output layer 130). In such an NN 100, and by way of example, the input layer may hold the raw pixel data of an image in a three-dimensional volume of width, height, and color. The convolutional layer 122 of such an NN 100 may output from connections that are local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as additional parameters (e.g., depth, stride, and padding). The pooling layers 126 of such an NN 100 may take as input the output of the convolutional layers 122 but perform a fixed function operation (e.g., an operation that does not take into account any weight or bias). Also in this example, the pooling layer 126 may not contain any convolutional parameters and may also not contain any weights or biases (e.g., performing a down-sampling operation).

The output layer 130 includes a series of output neurons 130-1, 130-2, 130-3, up-to 130-n (representatively 130-x). The output layer 130 holds a result of the analyzation of the NN 100. In some embodiments, the output layer 130 may be a categorization layer used to identify a feature of the input to the NN 100. For example, the NN 100 may be a classification NN trained to identify Arabic numerals. In such an example, the NN 100 may include ten output neurons 130 corresponding to which Arabic numeral the NN 100 has identified (e.g., output neuron 130-2 having a higher activation value than output neurons 130 may indicate the NN determined an image contained the number '1'). In some embodiments, the output layer 130 may be a real-value target (e.g., trying to predict a result when an input is a previous set of results) and there may be only a singular output neuron (not depicted). The output layer 130 is fed from an output connections 128-x. Output connections 128 provide the activations from the hidden section 120. In some embodiments, the output connections 128 may include weights and the output neurons 130 may include biases.

Training the NN 100 may include performing back propagation. Back propagation is different from forward propagation. Forward propagation may include feeding of data into the input neurons 110; performing the calculations of the connections 112, 124, 128; and performing the calculations of the calculation neurons 122 and 126. The forward propagation may also be the layout of a given NN (e.g., recurrence, number of layers, number of neurons in one or more layers, layers being fully connected or not to other layers, etc.). Back propagation may be used to determine an error of the parameters (e.g., the weights and the biases) in the NN 100 by starting with the output neurons 130 and propagating the error backward through the various connections 128, 124, 112 and layers 126, 122, respectively.

Back propagation includes performing one or more algorithms based on one or more training data to reduce the difference between what a given NN determines from an input and what the given NN should determine from the input. The difference between an NN determination and the correct determination may be called the objective function (alternatively, the cost function). When a given NN is initially created and data is provided and calculated through a forward propagation, the result or determination may be an incorrect determination. For example, NN 100 may be a classification NN; may be provided with a 128 pixel by 250 pixel image input that contains the number '3'; and may determine that the number is most likely "9" and is second most likely "2" and is third most likely "3" (and so on with the other Arabic numerals). Continuing the example, performing a back propagation may alter the values of the weights of connections 112, 124, and 128; and may alter the values of the biases of the first layer of calculation neurons 122, the second layer of calculation neurons 126, and the output neurons 130. Further continuing the example, the performance of the back propagation may yield a future result that is a more accurate classification of the same 128 pixel by 250 pixel image input that contains the number "3" (e.g., more closely ranking "9", "2", then "3" in order of most likely to least likely, ranking "9", then "3", then "2" in order of most likely to least likely, ranking "3" the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of NN 100. The NN 100 is provided a given number of training inputs n in a subset (or entirety) of training data that have input values x. The NN 100 may yield output a from x and should yield a desired output y(x) from x. Back propagation or training of the NN 100 should be a reduction or minimization of the objective function 'O(w, b)' via alteration of the set of weights and biases. Successful training of NN 100 should not only include the reduction of the difference between the answer a and the correct answers y(x) for the input values x, but given new input values (e.g., from additional training data, from validation data, etc.).

$$O(w, b) \equiv \frac{1}{2n} \sum_x \|y(x) - a\|^2 \quad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the NN 100 may be small in any given iteration. Back propagation algorithms may be repeated for many iterations to perform accurate learning as a result of the necessitated smallness of any given iteration.

For example, NN 100 may have untrained weights and biases, and back propagation may involve the stochastic gradient descent to train the NN over a subset of training inputs (e.g., a batch of ten training inputs from the entirety of the training inputs). Continuing the example, the NN 100 may continue to be trained with a second subset of training inputs (e.g., a second batch of ten training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would complete an epoch of the training data. Many epochs may be performed to continue training of an NN. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained NN, too many training epochs may yield overfitting in a trained NN, etc.). Further, NN 100 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Operating an Automated and Adaptive Animal Behavioral Training System Using Machine Learning The following application-specific acronyms may be used below:

AI artificial intelligence
GPS global positioning system
ML machine learning
MLM machine learning model Table 2
Application-Specific Acronyms One of the major challenges associated with training an animal is maintaining behavioral consistency at all times. This includes consistency of discipline and praise from all people that the animal interacts with, as well as consistency of discipline and praise at all times. Maintaining such consistency may be difficult and becomes impossible if nobody is around at a time when the animal requires disciplining. For example, a cat may scratch the furniture only when nobody is in the room.

Several animal training systems exist today, including: a) crate training which confines a pet—this challenges a pet because animals typically do not urinate or defecate in the same place as they sleep; b) leash training; c) shock collars with an ability to define a property perimeter; d) apps that integrate with collars—these add an ability to do things like sound training (i.e., prevent a reaction to negative sounds, such as fireworks and thunder); e) clicker training (for cats); or f) other form of training that is based on data that comes from an animal's own responses from training.

The challenges with these methodologies include: a) a high investment time in training; b) a lack of consistency across members of a household, which typically results in frustration and long delays in successful results; c) a lack of consistency across all times of day, especially when no member of the household is home with the pet; d) requirement that a person must be present for training; and e) limited training abilities—each existing training method has limitations in behavior aspects such that it is not applicable for training.

According to various embodiments disclosed herein, an artificial intelligence (AI)-infused animal training system generates models that learn over time and can provide training that is adaptive and tailored for each specific animal and owner, in an automated way, as animal behaviors change, and new training commands or techniques become necessary. This system also enforces consistency during the training process, as the system itself provides the training, and the training is not based on a set of different people with varying tolerance levels and training abilities. The subjectivity of human variation is removed from the equation, leading to a trained pet in a faster and more efficient way, and a happier household.

Existing products are limited to train pets for a specific purpose, such as to reinforce commands and stop unwanted behaviors such as jumping, digging, and chasing. For example, pet collars with global positioning system (GPS) trackers provide only negative reinforcement in regards to the pet's location. There are also products that are limited for tracking pets' activity levels. Furthermore, there do not appear to be systems that provide an animal training mechanism that uses ongoing ML to adapt to the specific behavior patterns of a specific animal and the specific behavior requirements of its owner(s).

An important method that is considered to be the best animal training method is positive reinforcement, which requires that the owner communicate clearly with the animal. The owner decides what the animal should do and lets the animal know by offering rewards when the animal exhibits the desired behavior patterns. When the animal is rewarded for doing things correctly, it is more likely to repeat those good behaviors because animals, especially pets, aim to please.

Various embodiments disclosed herein provide for a system that learns and adapts automatically to a specific animal and its specific owners' requirements by using a combination of ML, user feedback and configuration, and precalculated data. This system may be configured to use training actions (responses) triggered as part of the system, and may include both positive reinforcement training actions and disciplining training actions. One or more different responses, either positive or negative action types, at various intensity levels and through an array of device types, may be provided.

Embodiments of the system disclosed herein may receive, use, transform, and/or aggregate information from multiple types of sensors. These sensors may include sensors attached to the animal, non-stationary and stationary devices in the animal's living space, and sensors embedded in mobile devices carried by a human user. Inputs from some or all of these sensors may be combined to learn the animal's behavior patterns and generate effective training responses. Which sensors will be used for an individual animal may be manually or automatically configured. Various embodiments may provide methods for configuring and adapting the system to individual animals using multiple aspects, such as animal types, breeds, age, weight, and classes of these aspects. Methods may be provided for configuring which training action devices to use for an individual animal, to achieve both positive reinforcement and disciplining, and a mapping of action type and level of intensity to specific actions of the training devices for an individual animal. Further methods may be provided for configuring a mapping of specific sensor data to actions and intensity levels.

In some embodiments, notification of unacceptable behavior may be presented to both the owner and animal, and a reward system may be provided. The system may recognize, measure, and react to behaviors, and provide for course correction if the pet commits an infraction. The system may use dynamically defined regions for different behaviors. The system need not require human initiation of responses; it recognizes behavior patterns, and automatically initiates responses to the behavior patterns. The system may adaptively recognize a variety of behavior patterns unique to the animal. Machine learning may permit intelligent learning by the system over time, and is designed to identify and act on behavior patterns exhibited by an animal, such as a dog or cat, that are either desirable or undesirable, and perform positive reinforcement or disciplinary actions correspondingly.

Figure 2:
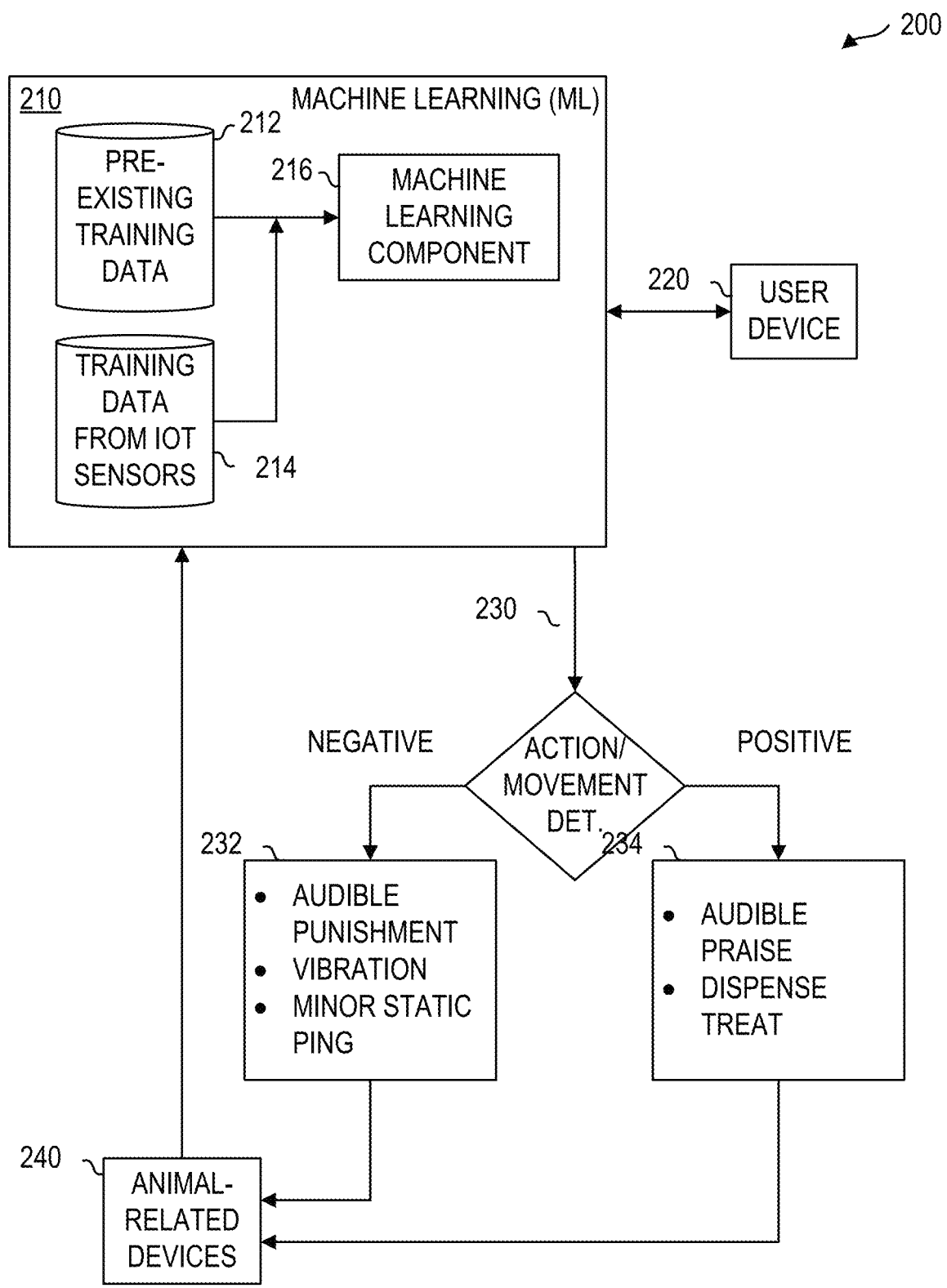
FIG. 2 is a high level diagram of the disclosed method and system.
Figure 5:
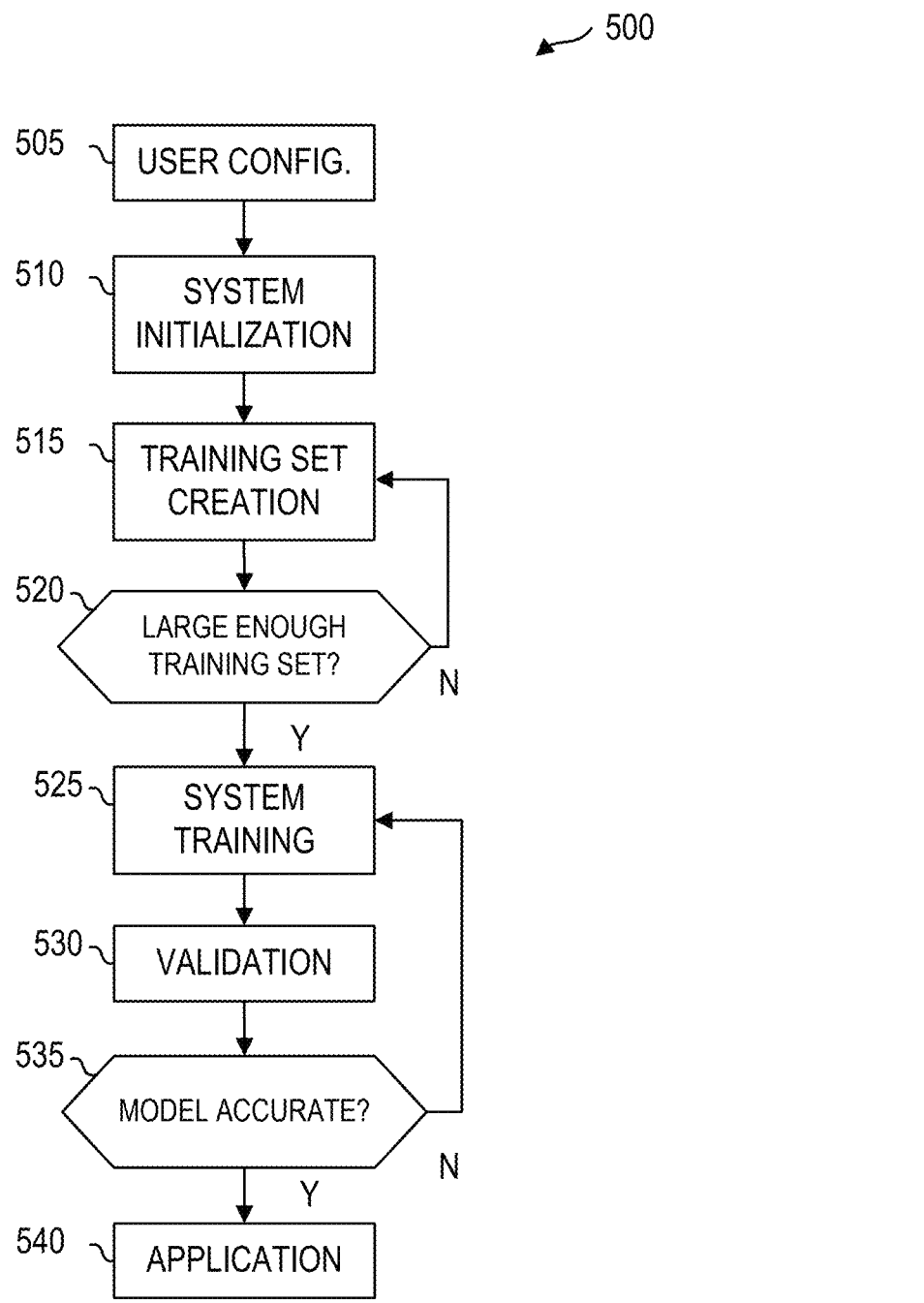
FIG. 5 and related text describe a proposed method for configuring, initializing, training, validating and using the proposed animal training system.

FIG. 2 is a high-level combination block/flow diagram according to some embodiments of the disclosed system 200 and method (process 500, FIG. 5). The system 200 may comprise ML 210 that receives some of its input (user feedback) from a user device 220. The user device 220 may also be used to provide alerts to the user. The user device may be, e.g., a DPS 10. The ML 210 may comprise an ML component 216, such as the neural network 100, that contains the algorithms and data to perform the ML functionality. The ML component 216 may be trained using pre-existing training data 212 and training data from IoT sensors 214 and owner feedback for continuous training. Such training data 214 may originate from, among other things, animal-related devices 240, such as a smart collar that may be embedded with, e.g., an accelerometer, a gyroscope, a GPS tracker, a microphone, etc. The ML 210 determines an occurrence of a particular behavior pattern of the animal 230 that results in negative action 232, such as an audible punishment, vibration, minor static ping, and the like, or positive action 234, such as audible praise or the dispensing of a treat, and the like.

Figure 3:
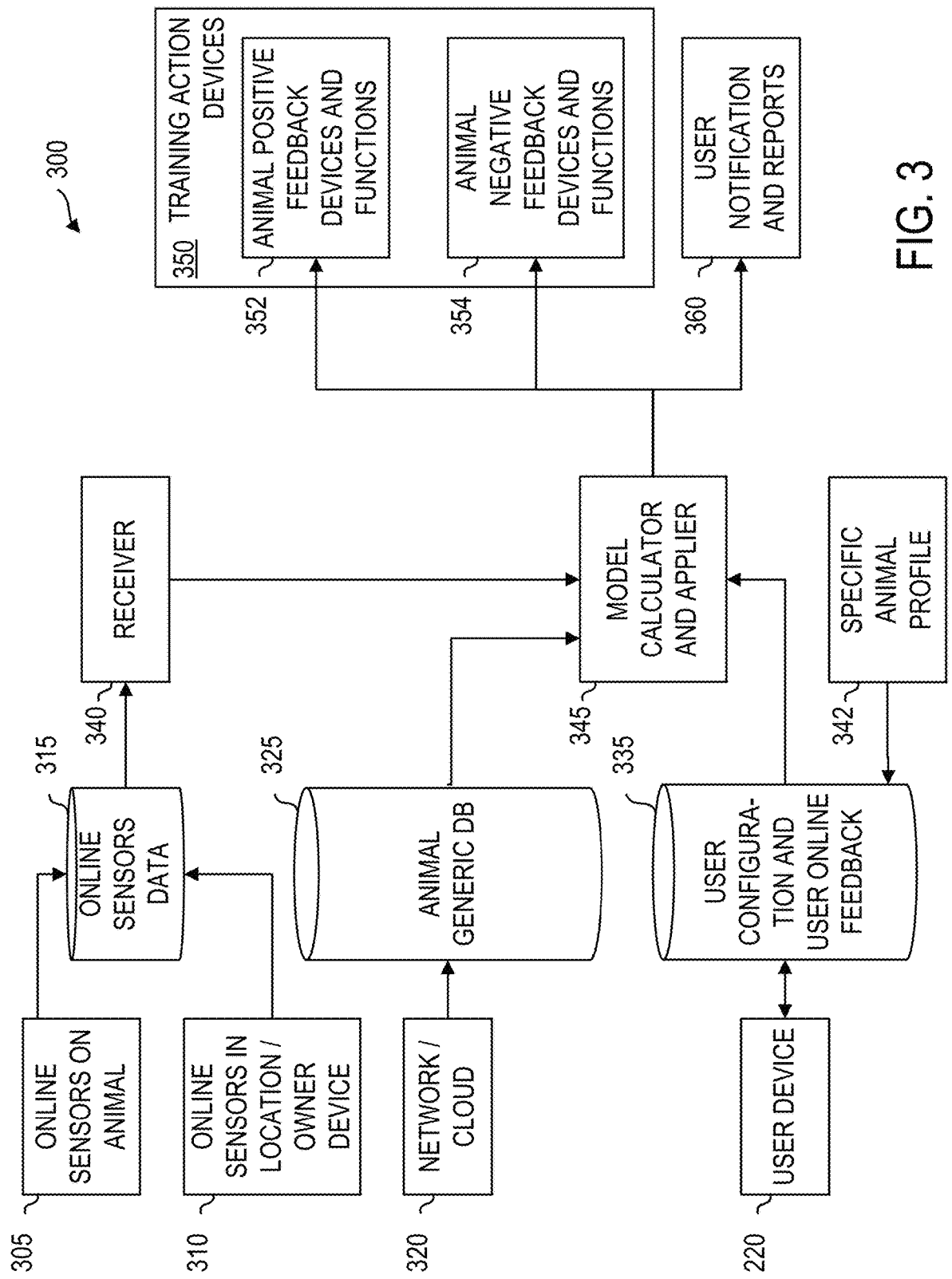
FIG. 3 is a high-level architecture diagram of the system.

FIG. 3 is a high-level block diagram of the system architecture 300, according to some embodiments. In general, the inputs are shown on the left, and the outputs are shown on the right. One of the inputs is the animal online sensors 305 that may be mounted on or worn by the animal and may include the animal-related devices 240 discussed above. Additionally, location sensors 310 may be located in a particular location of an owner of the sensor device. Such location sensors 310 may include cameras, proximity sensors, motion sensors, and the like.

The animal online sensors 305 and the location sensors 310 may generate online sensors data 315. This sensor data may be collected at a receiver 340 and processed for input into an ML model calculator and applier 345 that contains the ML used to determine various functions to apply. The receiver 340 may, in some embodiments, be embedded in a stationary device in the house or in a mobile device with an app. The various functions to apply may include training action devices 350 to provide output to animals in the form of positive feedback using animal positive feedback devices 352 and their associated functions, and negative feedback using negative feedback devices 354 and their associated functions. The ML model calculator and applier 345 may use the sensor data, precalculated data, and user inputs to train, validate, and use the model. The ML model calculator and applier 345 may be embedded in a stationary device in the house, or in a mobile phone with the app, or part/all of the functionality embedded in a cloud. These functions to apply may also include output to users in the form of user notification and reports 360.

The ML model calculator and applier 345 may also receive input from a network or cloud interface 320. Such a network or cloud may be, e.g., the cloud computing environment 52 discussed above. This input may be stored in an animal generic database 325 that contains pre-calculated data, including pre-calculated model instances, for the animal's type, age, and other generic animal class profiles. This animal generic database 325 may contain information relevant to animals of the same or similar class(es) and type(s), such as type (e.g., cat, dog), breed (e.g., English Cocker Spaniel), age, etc. The ML model calculator and applier 345 may utilize information from the generic database 325 as a part of the ML model-however, the ML model calculator and applier 345 should change over time as feedback from the specific animal is received, e.g., from the receiver 340 and other feedback elements, such as the specific animal profile 342.

The user device 220 may also be used to provide user configuration information in the user configuration and user online feedback database 335. The configuration information may include information that may be stored in the specific animal profile 342, and also information about the various animal sensors 305 and location sensors 310. The user configuration and user online feedback database 335 may also be used to store online feedback received from the user.

Figure 4:
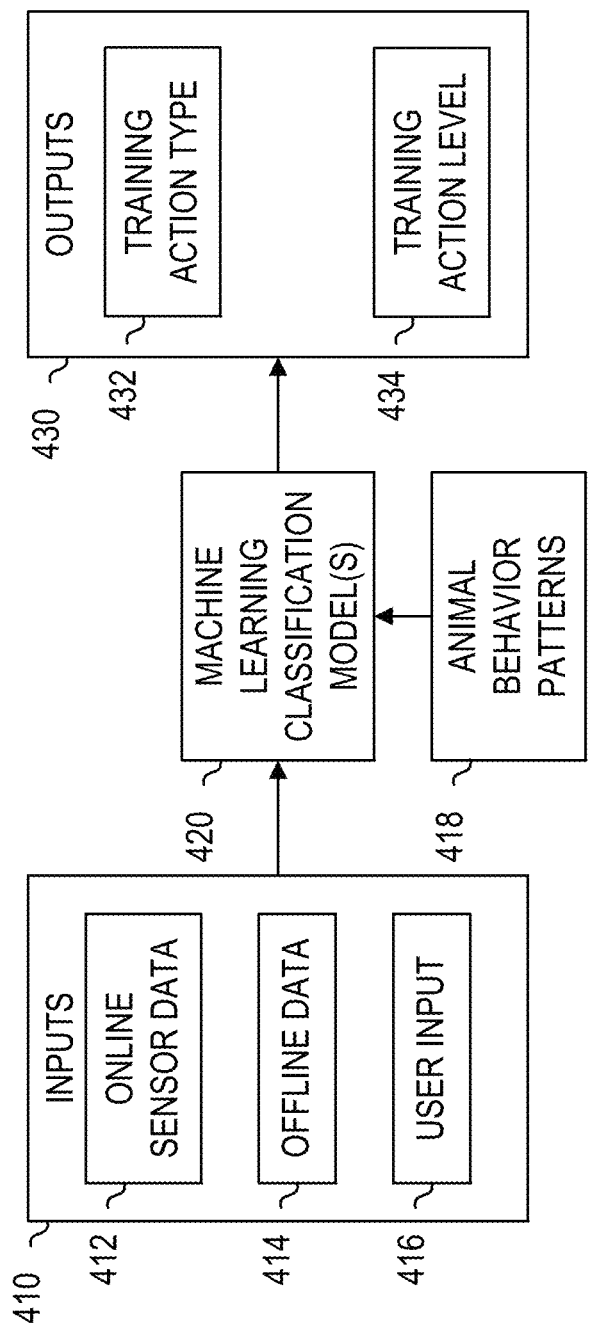
FIG. 4 illustrates an overview of the ML mechanism in the system.

FIG. 4 is a block diagram that illustrates an overview of the ML mechanism 400 (216) in the system 200, according to some embodiments. The system 200 collects a variety of online sensor data 412, offline data 414, and user input 416 as input 410 into one or more ML classification models 420, and identifies positive and negative behavior patterns with an associated training action type 432 and training action level 434.

Online sensor data 412 may include data collected from multiple connected devices and sensors. These may be wearable devices attached to the animal, stationary devices located in the animal's living space, or mobile devices carried by the human user. The online sensor data 412 may include, e.g., data related to an attachment type (animal body, location, owner held device), and a sensor type (audio, video, GPS tracker, gyroscope, accelerometer, heat sensor, and body measurement sensors). The system 200 may collect data from multiple sensors and devices, for example: audio, video, GPS, gyroscope, accelerometer, heat sensor, body measure sensors, etc. The system 200 may be pluggable and not require all sensor types to be used for the system to work, although certain behavior patterns may be captured by specific sensor types. Offline data 414 may include pre-calculated parameters of ML models and any training set data, which may be based on data captured from other animals having similar characteristics, e.g., those of the same type, age, size, and any other attribute of the current animal, as well as models that were already trained based on this data. User inputs 416 may include both: a) configuration information, and b) continuous online feedback provided by the user and that is used to train and refine the models being used on an ongoing basis.

In some embodiments, the ML classification model(s) 420 may continuously capture and identify the animal's behavior patterns 418, classifying them as a neutral, positive, or negative behavior patterns. For positive and negative behavior patterns, the ML classification model(s) 420 may further classify these behavior patterns into outputs 430, including a training action type 432 and a training action level 434. The training action type 432 may include a positive action, a negative action, and a neutral (or no) action. The training action level 434 may be based on a level of intensity, and each combination of action type 432 and level of intensity 434 may be configured by the user or based on default settings to a specification of specific actions by the output devices of the system 200 . . . . The ML classification model(s) 420 may then trigger these actions via the output devices based on these outputs. Negative animal behaviors may include (but are not limited to): a) household: chewing clothing, shoes, furniture, climbing on furniture, clawing on doors or walls, or discharging waste; b) yard/pasture/outside: digging holes, attempting to escape; and c) public venues (during walks, sitting outside in a public space): biting, barking, jumping on individuals, attacking humans or another animal. Positive animal behaviors may include (but are not limited to): a) good social behavior; b) calm behavior (when guest at home, kids sleeping); c) being obedient and responsive; and d) sitting, standing, moving, and giving up objects on command.

FIG. 5 is a flowchart that describes a proposed process 500, according to some embodiments, for configuring, initializing, training, validating, and using the animal training system 200. In operation 505, the user may configure, using their user device 220, various user configurable data 335. This may include, by way of example only: 1) the specific animal profile 342, including animal name, type, breed, age, weight and size; 2) which sensors 305, 310, 412 to use for the animal; 3) user mapping of action type 432 and action level 434 to specific actions to be performed by the output devices 430; 4) static definitions of specific sensor data 412 mapping to actions (e.g. specific locations, sounds above threshold-mapped to specific actions by the output devices); and 5) confidence level from which the system 200 can apply actions automatically, or, alternatively, if the system 200 is configured to confirm proposed actions with the user.

The above information may form all or part of the specific animal profile 342, which may contain information about a specific animal (e.g., a specific dog's name, "Winston", his age, weight, and other characteristics). The specific animal profile 342 defines the identity of an individual animal, and may include other parameters required to operate the training system for the specific animal. These details may also be used for the following purposes: 1) in environments with multiple animals—to associate sensory data and models to a specific animal; and 2) to identify aggregated pre-calculated information 325 that is relevant for use for a specific animal.

Part of the static definitions specified above may include, for example, location specifications and associated actions and levels. For example, the animal entering a location that it is not allowed to enter should trigger a negative action for the animal by the negative devices and functions 354. Another example of a static definition may be a sound (e.g., a barking sound) with a specific recognizable pattern(s) generated above a threshold that will trigger a negative action. Location definitions may be used directly, or in combination with other behavior patterns. When used directly, the location definitions may be used to indicate areas of a space that the animal is not allowed to be in. When used in combination with a behavior pattern, the location may be used to limit where certain behavior patterns are considered unacceptable. For example, jumping may only be considered a negative action when the animal is indoors.

The system 200 may obtain pre-determined defaults for static definitions of sensor readings to actions in, e.g., the animal generic database 325, where these defaults may be associated with, e.g., the specific type, breed, and age of the animal. For example, a default may specify that a sound generated over a set volume and/or duration threshold will trigger a specific action and level. The user may then accept, modify, or reject these defaults. The system 200 may also maintain history information per animal, which may be associated with the animal profiles. The history may include training set information, past training actions taken, etc.

Once the configuration 505 of the system 200 by the user is complete, an initialization operation 510 may begin. In some embodiments of the initialization operation 510, a pre-calculated ML model instance may be selected based on one or more attributes of the animal, e.g., the animal's type, breed, and age, (e.g., information from the animal generic database 325) and used to initialize a customized instance of the model. Over time, the ML classification model(s) 420 may capture various behavior patterns of the specific animal and receive user feedback on how to classify these behavior patterns into positive/negative classifications 350, 354 as well as a required action 432 and level of the action 434. This enables adjustment of the parameters of the customized model instance of the ML classification models(s) 420 dynamically for the specific animal.

The system 200 may also support receiving as input and/or automatically setting and tuning a weight by which the pre-calculated model parameters are considered relative to the new parameters calculated based on the specific animal's behavior patterns in the process of training the system.

The process 500 then, in operation 515 enters a training set creation phase. During this phase, the system 200 dynamically captures behavior pattern's sensor data 315 for the animal and receives user feedback, which may either be triggered by the user or solicited by the system 200 based on the pre-calculated parameters, regarding classification of the behavior pattern to positive or negative and the action to take for each pattern. This generates a training classification set.

In this training set creation phase, actions in response to observed animal behavior patterns may be taken when triggered and requested by the user feedback, and when these user requests are received within a time window still relevant to the captured behavior pattern. The feedback received from the user may include an indication of how long ago the behavior pattern for which the feedback is associated occurred. For example, the feedback may be prompt-relevant to a behavior pattern observed at a current point in time, or can be associated with a behavior pattern that was observed some time ago (e.g., a minute ago, or longer). The system 200 may support a review of sensor data 315 by the user and receiving of user feedback at a later time (e.g., a review of video, audio, GPS, and other sensor data at a later time). User feedback for a behavior pattern that occurred outside of the above-mentioned time window may, but need not trigger an action, but the relevant sensor data and user feedback may still be added to the training set. This training set creation operation 515 phase may continue (loop 520: N to 515) until the system determines that the training set is sufficiently large, in operation 520: Y. The time spent in this phase may depend on a frequency of user feedback provided.

Given a user feedback trigger by the user on an observed animal behavior pattern (the feedback is the classification of the behavior pattern and requested action 432 and level 434), the following describes an embodiment of how to prepare an input record for the training set from the input sensors data 315, e.g., by the receiver 340.

Readings from the various sensors 305, 310 are received in a continuous way, e.g., by polling the sensors at some frequency, by the sensors pushing readings data, or in response to some triggering event. The user feedback input stored in the user configuration and user online feedback database 335 may come with an indication of the times when the associated behavior pattern ended and started. For example, the user can indicate that the behavior is still ongoing or ended two seconds ago, and that it started ten seconds ago. In such a case, the system 200 has the time boundaries for the current training record from the sensors' data 315.

If the user indicates only the end time of the behavior (e.g., that the behavior is still ongoing or ended a few seconds ago), the system 200 must determine a best start time from which to include the sensors' data 315 in the training record. To achieve this, the following options may be implemented. In one embodiment, for each sensor input, a search back may be performed for a value which has a larger relative difference from its preceding value above a threshold. Alternately, a search back for an outlier value may be performed. In other words, a search back may be performed for an extreme value to delimit and specify the start time with regard to this sensor data 315. The search back may be limited to a time window, e.g., thirty seconds. If no outlier is found in the time window, the value with the largest difference from its preceding value may be taken. When the extreme values from all the sensors have been found, the system 200 may select the time of the oldest extreme value in the time windows across all the sensors as the start time for the generated training record.

Another embodiment may be implemented similar to the preceding, but a different time length may be selected for each different sensor. A further embodiment may be implemented which use several fixed size lengths, and for each length, a separate set of ML models may be used. For example, a separate set of ML models may be used for sample lengths of 5, 10, 15, 20, 25, 30 seconds. Then, the set of models with the best accuracy may be used in later stages.

Given that a time length is determined for generating the training record, as described above, a next question is how to prepare the values of each sensor for the training record. Each sensor may provide multiple readings for different times in the time length. The multiple readings may be aggregated, or a representative value may be selected in any way that is workable for the specific sensor. Aggregation may be performed, e.g., by calculating an average or median from the sensor readings, or alternatively calculating an extreme value (min, max, etc.) of the readings. Each sensor may employ a different way of aggregating values or otherwise selecting a representative value. It is also possible that multiple values from a sensor will be included in the generated training record if the ML model being used supports this option.

It is possible in this stage (or another stage) to apply feature extraction techniques for sensor data that includes multiple features in order to extract the most important features of each sensor data. Aggregation/selection for the time window may be applied on the selected features.

Upon building a large enough training set 520: Y, the process 500 will automatically enter the system training operation phase 525 and begin to train ML models 420 based on the training set 212, 214. The process 500 may use any set of ML models 420, that is, it may use models of different types and may also use multiple instances of each model, where each instance uses different training techniques or training sub-sets or parameters. These model types and instances may be used simultaneously. Following are examples of ML model types 420 that can be used for the classification problem addressed in this system 200: logarithmic regression, neural networks, support vector machines, random forests, k nearest neighbor, and gradient boosting.

To prepare the generated training set for inputting to ML models 420, various supporting techniques may be used. In some embodiments, records are removed that contain outliers in one or more of their sensor record fields. In some embodiments dimensionality reduction is applied on the records of a training set to select the most efficient sub-set of dimensions to use for training. It is also possible to apply in this stage any type of training set partitioning/sharding/slicing technique to increase accuracy and/or resiliency of the trained models.

The process 500 may detect that certain sensor readings indicate that a behavior pattern is taking place with confidence values based on how close the sensor readings conform to a behavior pattern profile. For example, the accelerometer and microphone may be used to understand when a cat is scratching a piece of furniture with a specific confidence level. In this case, the accelerometer may be used to detect the motion that is happening, and the microphone may be used to detect the sound that is being produced.

Once the system training operation 525 is complete, a validation operation/stage 530 begins. In the validation operation 530, the system 200 continues to perform all functions of the training set creation operation 515. Additionally, the system 200 now provides proposed classifications of the animal's behavior patterns of positive and negative with associated proposed actions 432 and levels 434, in a system mapping operation, based on each captured behavior pattern, and requests user validation on the correctness of these predictions. When the user validates a system prediction, this may add a training record with the sensors' inputs and output classification. When the user disapproves a system prediction, an appropriate training record with the user's classification may be generated, or training record can be dropped (i.e., not generated), or previous training records that exist and are related to the captured sensor input may be modified or may be unlearned. This process may be used to extend and refine the training set, and to measure its effectiveness. Like in the training set creation phase 515, in some embodiments, actions are only triggered when user feedback is provided within a relevant time window for the action.

During the validation operation 530, the system 200 may continue to be refined and retrained until the models 420 being used reach or exceed an acceptable accuracy predefined MLM accuracy threshold. The functions of the training set creation operation 515 may be continued. The system 200 may provide system generated classifications and predictions, action types, and action levels to the user based on behavior patterns, and request user validation of the mapping of the classifications and predictions to the action type and action level. This may be used to extend and refine the training set, and to measure model effectiveness. In some embodiments, actions here may be taken only triggered by user feedback.

Once the acceptable accuracy threshold is reached 535: Y, the process 500 may automatically enter the application phase 540, and the user may be notified. Otherwise, 535: N, the system training 525 and validation 530 may continue.

In the application 540, the process 500 may continue to perform all functions of the validation phase 530, but may now automatically perform positive 352 and negative actions 354 based on the system classifications and system predictions. During this application phase 540, users will also be able to provide feedback based on historical data for captured behavior patterns and actions taken. If at any time the user feedback indicates that the models being used no longer meet the acceptable accuracy threshold, then the system 200 may automatically revert to the validation phase 530 or the training phase 525 and the user may be notified.

In the application phase 540, the system 200 may use a combination of two methods or more to classify the animal behavior pattern to classes, actions and levels. The first method may use the static definitions that map sensor readings in ranges or above thresholds, in any combinations, to a behavior class, action, and level. The second method may use the trained ML models 420, which receive as input 410 continuous sensor data that is partitioned based on time and prepared using the techniques described above, and produce as output 430 a predicted classification, action 432 and level 434. For a window of sensor inputs, if the static mapping definitions do not provide a classification, then the trained ML models may be used to check the sensor readings. If multiple types and/or instances of ML models 420 are used, then a classification, action and level result may be reached by aggregating the results of the various types and instance. Over time, based on user input for validating the ML models 420, any sub-set of the model types/instances may be removed or modified based on the user feedback. For example, the user feedback may indicate that specific type/instances of ML models 420 have better accuracy/performance compared to other for the specific animal being trained. The functions of the application phase 540 may include the functions of the validation phase 530, but also that actions are taken based on system (ML model) predictions, and the system 200 may notify the user that the application phase 540 has been entered.

The system 200 may accept monitoring data from a variety of devices and sensors 305, 310, 220. These may include stationary devices in the animal's living space, wearable devices attached to the animal, or mobile devices carried by the human user. The following are examples of the types of monitoring devices and sensors which can be used. For the type of attachments and placement of sensors: 1) sensors attached to the animal, e.g., on a collar or chip; 2) sensors placed in a location, e.g., room or yard; 3) sensors placed on a non-human-interacting mobile robot, e.g., on a livestock/wild animal habitat patrolling/flying drone; and 4) sensors attached to device carried by a human, e.g., mobile phone sensors.

The type of sensors may include, e.g., 1) audio, e.g., microphone, on the animal or at a stationary or moveable location; 2) video, e.g., a camera, on the animal or at a stationary or moveable location; 3) GPS tracker; 4) proximity or boundary sensors; 5) gyroscope; 6) accelerometer; 7) heat sensor; and 8) body or biometric measure sensors, e.g., heart rate, body heat. These monitoring devices may send their real-time data into the system to be used for determining and classifying the animal's behavior patterns into classes, actions and levels.

Figure 6:
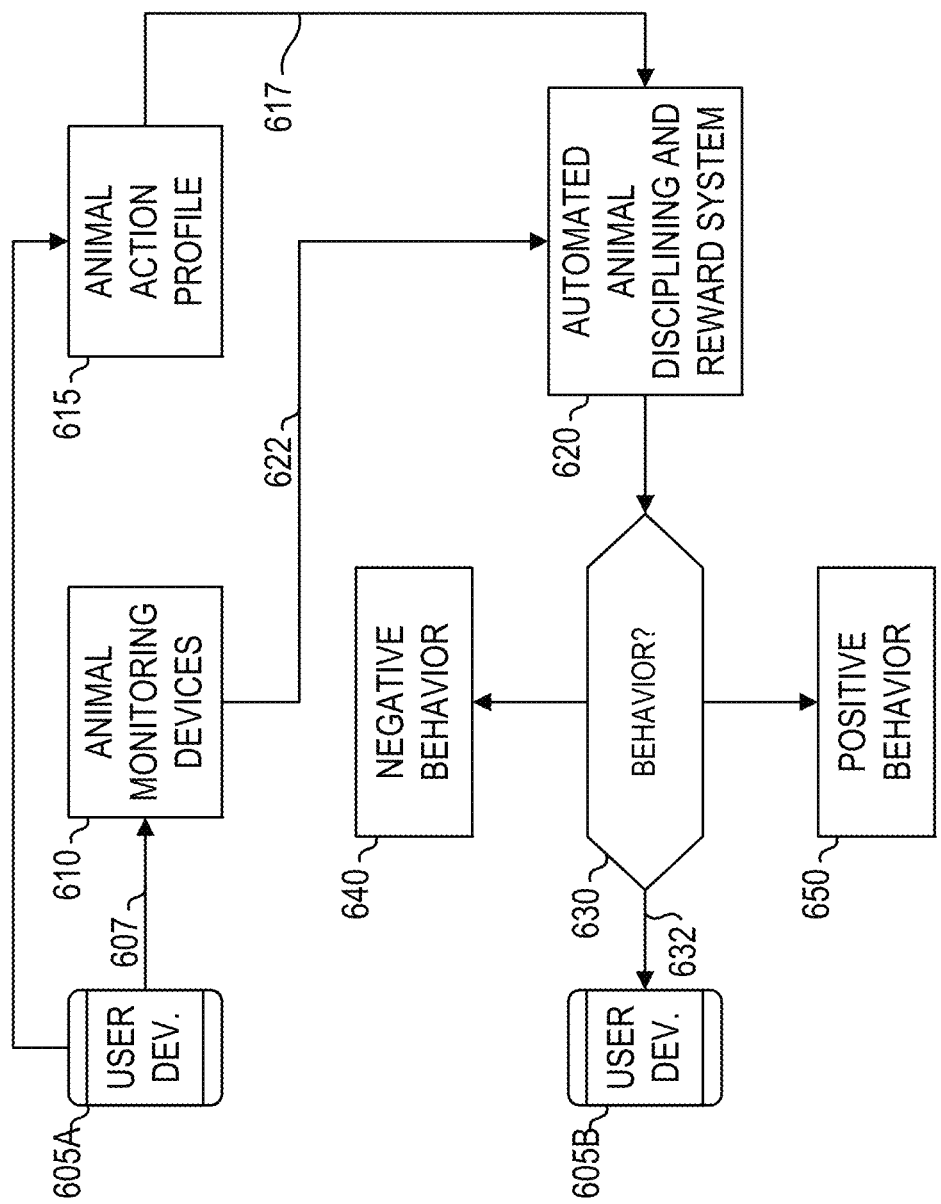
FIG. 6 illustrates a way that various monitoring devices can be used in the system.

FIG. 6 is a block flow diagram that illustrates a way that various monitoring devices may be used in the system 600 (200), according to some embodiments. The user device 605A may be used to generate or select a specific animal profile 607, and this profile 607 may be used to store animal related information including which monitoring devices 610 should be used for the animal. An analysis 622 of inputs provided from the animal monitoring devices 610 may be used in conjunction with an animal profile 617, and a result may be assessed using an automated animal training system 620 in real time to determine a confidence level in the detected behavior. The automated animal training system 620, may utilize the ML behavior data along with the data from the sensors and the data profile the animal profile. The training system 620 may determine 630 whether the animal behavior constitutes negative behavior 640 or positive behavior 650. Additional information in the form of an alert or other feedback 632 may be provided to the user device 605B (which may, but does not have to be, the same user device 605A).

The negative behavior 640 may trigger the animal negative feedback devices and functions 354, and the positive behavior 650 may trigger the animal positive feedback devices and functions 352. The positive (praising) 352 and negative (disciplining) 354 action devices may be connected to the system 200 and enable the performance of training actions towards the animal. Some of the devices 352, 354 may be connected to the animal and other devices may be not connected to the animal. The user may configure which devices should be used for each specific animal (training action type 432), which training action levels 434 should be used, and the mapping between action type 432 and level 434 to actual actions performed by the devices. A pair of action type 432 and level 434 can me mapped to multiple action devices and multiple actions performed by these devices.

By way of illustrated example, the pair "positive action and action level one" may be mapped to a praising sound coming from a speaker; the pair "positive action and action level two" may be mapped to a praising sound coming from a speaker plus a small treat being dispensed; and the pair "positive action and action level three" may be mapped to a longer praising sound coming from a speaker plus a large treat being dispensed. Examples of positive (praising) action devices 352 may include, but are not limited to: a treat dispenser, and an audio sound device. Examples of negative (disciplinary) action devices 354 may include, but are not limited to: a static correction collar; a vibration collar; a spray collar; an ultrasonic sound device; and an audio sound device.

Some practical examples of an audio device might include a whistle that produces a noise in the range of frequency that the animal reacts to, or a device that plays a recording of the owner's voice. Examples of physical reaction devices may include collars that vibrate, provide a small shock, or spray water. Depending on the device type, a level of intensity may be associated with the actions that can be performed. For example, in a static correction collar, a higher intensity action will result in a stronger shock. In an audio device, a higher intensity may trigger a louder sound, or a different audio recording. In a treat dispensing device, various intensities can be mapped to various treat sizes and/or various treat types.

In some embodiments, the triggering action mechanism of the action devices may have a minimum time interval of trigger-per-time to increase the significance of the actions and to avoid any situation of animal cruelty. If the minimum time interval since the last training action has not completed, the system will continue to monitor and classify the animal's behavior patterns but will not trigger training actions. Similarly, a maximum on the level of intensity or the number of times triggered may be associated with each type of training action. In such a case, the system may notify the animal owner and avoid triggering further training actions until receiving indication from the animal's owner that the system may do so.

Figure 7:
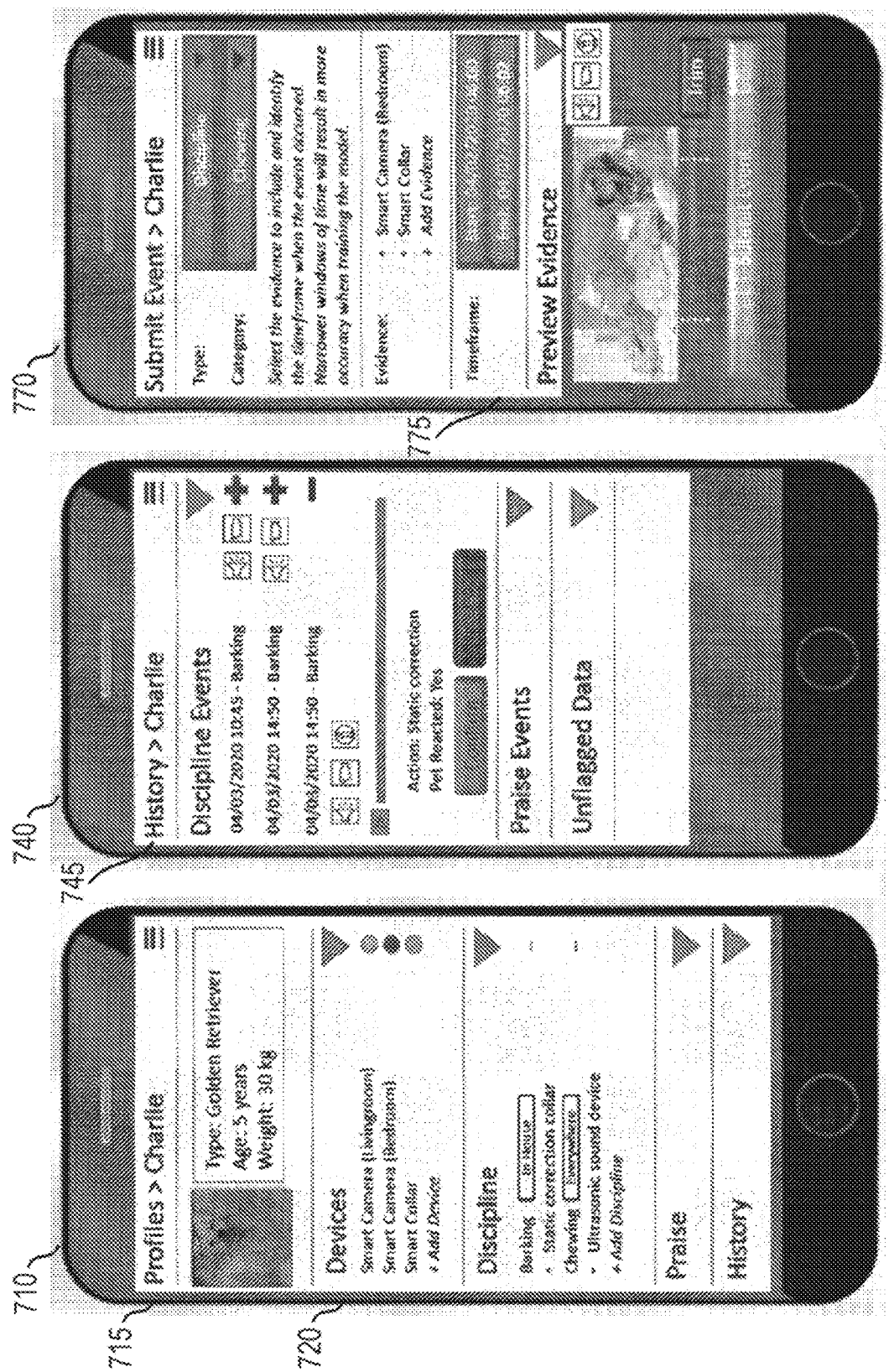
FIG. 7 is an example of the animal owner interface, to illustrate how a pet owner can interact with the system.

FIG. 7 comprises shots of screens 710, 740, 770 for a user interface 700 of a user device, according to some embodiments. The user interface 700 is where the interaction may be done between the user and the system 200. The user interface 700 may comprise several features, including animal profiles and configurations, behavior classification and training actions history, connected sensors, and connected training action devices.

On a profile screen 710, the user has selected the profile "Charlie". An attributes section 715 may show basic information, such as an image, type of dog, age, and weight. A connected devices section 720 may include a list and status of the sensors 305, 310 and the training action devices 350 that are connected to the system 200. For sensors 305, 310, the entry for each sensor may include statistics about their data readings at various times and events. For training action devices 350, the entry for each device may include a history of the actions, levels and times performed by the device. Here, the user may enable or disable sensors and training action devices temporarily or permanently, or add and remove devices to/from the system.

On the profile screen 710, the user may configure, e.g., the following information: 1) animal name, type, breed, age, weight and size; 2) which sensors to use for the animal; 3) a mapping of behavior type to specific actions to be performed by the output devices; 4) static definitions of specific sensor data mapping to actions (e.g., specific locations, sounds above a threshold-mapped to specific actions by the output devices); 5) a confidence level from which the system 200 may apply actions automatically, or alternatively if the system should always confirm proposed actions with the user.

On a history screen 745, the user may be presented with a list of events. Events may be grouped into several categories, such as: 1) events classified as a negative behavior pattern—these are events for which a negative training action was taken or recommended; 2) events classified as a positive behavior pattern—these are events for which a positive training action was taken or recommended; 3) suspected events—these are events that were detected by the system with a lower degree of confidence, and, as a result of the lower confidence, no action was taken; 4) events for user confirmation—the system displays events to the user (video, audio, locations, etc.) and requests user classification, optionally showing a proposed system classification.

In some embodiments, for different types of events, the user can listen to audio, view video or images, view locations, and view other sensor data as evidence associated with the event. For each event, the user can confirm or reject the events, as well as enter the required action and level, to provide more input to the system and improve accuracy. Additionally, the user can access audio, video and raw data that has been captured but was not classified as an event. This is useful in identifying behavior patterns which may have been missed by the system. In this case, the user can submit a new event using an event submission screen 770 by selecting a timeframe 775 during which the event occurred and providing a classification, action, and level for the event. These events may provide input for continuous training of the system.

Figure 8:
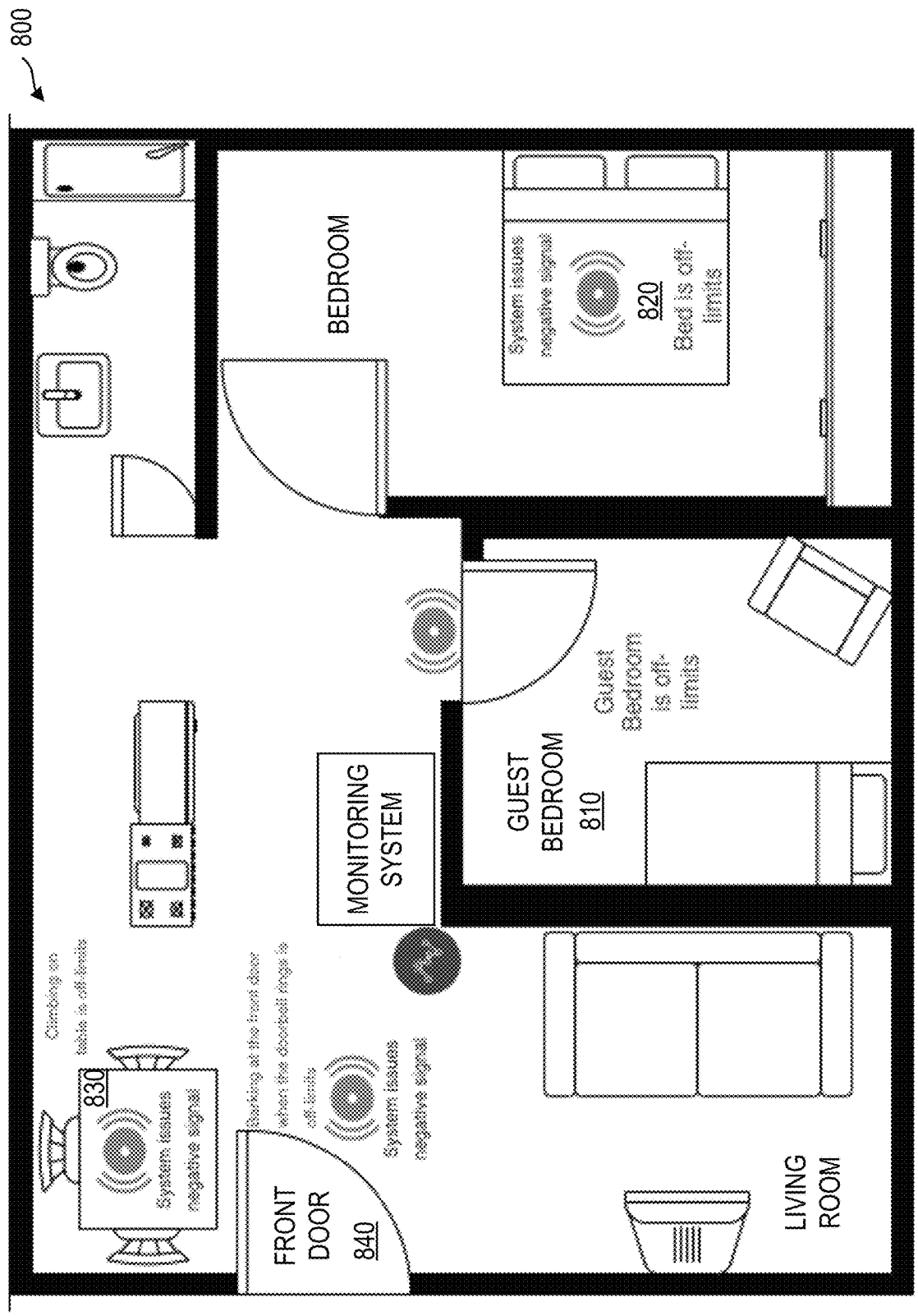
FIG. 8 is a plan diagram of an apartment used to illustrate a use case.

FIG. 8 is a pictorial diagram of a location 800 for a use case to illustrate some embodiments of the system 200. In this use case, user Sam has a toy poodle named Charlie. Sam lives in New York City in a 900 square foot apartment. Sam desires to use the system 200 to train Charlie to not: 1) go into the guest bedroom 800; 2) climb on top of his bed 820;

3) climb on top of the kitchen table 830; and 4) bark at the front door 840 when someone rings the doorbell.

When Sam acquires the monitoring system 200, it has already been customized and trained to know what type of animal Charlie is and the behaviors that are acceptable and prohibited for this type of animal (but not Charlie specifically). To train the system 200, Sam: 1) sets up the monitor system 200 with connected sensors 305, 310 in each of these locations; 2) trains the monitoring system 200 with the location and/or behavior pattern profiles of the areas that are off limits for behaviors that are prohibited. (e.g., barking at the front door); 3) sets up an animal profile for Charlie; and 4) attaches a collar that is connected to the monitoring system 200. Once this is complete, the monitor system 200 is ready to notify Sam when it detects positive and negative behaviors. It reports these 360 in his application on his mobile device 605B.

In some embodiments, Sam may be able to enable/disable the monitoring devices and/or each type of positive/negative devices through the animal owner user interface 700. Sam can configure the monitoring system 200 to respond to each type of behavior. The monitoring system 200 may be continuously collecting data about Charlie's behavior. This includes recordings of how many times the monitoring system 200 needed to communicate with Charlie. The monitoring system 200 may note at what stage Charlie responded. This information for the goal of weaning Charlie off the monitoring system 200.

In this example use case, Charlie is a relatively young puppy. For the first three days and nights, Sam verbally scolds Charlie for being in the three areas that are off-limits. On the fourth night, Sam turns on the monitoring system 200. Charlie tries to climb into bed with Sam, which was designated as an "off-limits" area, and Charlie gets a verbal scolding from the monitoring system 200. Charlie ignores the verbal scolding and then his collar vibrates, startling Charlie. The next morning, Charlie tries again to climb onto the bed with Sam and Charlie gets a minor sting through his collar. Charlie yelps and walks away. This happens a couple more times, and then Charlie begins to learn. Sam issues a positive reinforcement from his mobile interface when he sees Charlie sitting by the bed instead of trying to climb up. The system 200 has collected information about Charlie's behavior over several weeks. Sam sees that Charlie is behaving, even when Sam is not in the apartment. Sam adjusts the system to continue to reward Charlie.

Technical Application

The one or more embodiments disclosed herein accordingly provide an improvement to computer technology. For example, an improvement to a ML system that is adaptable for use in animal training reflects such a technical application.

What is claimed is:

1. A method for automatic animal behavior training, comprising, using a computer processor:
   receiving user configuration information and user feedback information from a user regarding a specific animal;
   receiving input from sensors for the specific animal;
   determining a mapping between the input and a set of positive and negative training actions to apply for the specific animal;
   in a generating phase:
      generating a training set for an animal behavior machine learning model (MLM) based on sensed animal behavior patterns and the user feedback information;
   in an MLM training phase:
      training the animal behavior MLM based on the training set using back propagation that includes gradient descent to reduce an objective function by altering a set of weights and biases of the animal behavior MLM to increase accuracy of the animal behavior MLM, wherein the animal behavior MLM comprises a neural network;
   in an application phase:
      sensing, by the sensors associated with the specific animal, a behavior of the specific animal to produce a sensed behavior; and
      conditioned upon the sensed behavior, providing an animal training action,
   wherein the user configuration information and the user feedback information comprise:
      specific animal name, type, breed, age, and weight;
      which of the sensors to use for the specific animal;
      which training devices to use for the specific animal;
      a user mapping of training action types and training action levels for training action devices to corresponding behaviors of the specific animal; and
      static definitions of specific sensor data mappings to specific training action types and specific training action levels.

2. The method of claim 1 further comprising initializing the animal behavior MLM by starting from a pre-calculated model instance that is associated with an attribute selected from the group consisting of the specific animal's: type, breed, age, and weight.

3. The method of claim 2, further comprising initializing a plurality of animal behavior MLMs that include the animal behavior MLM, by starting from a plurality of pre-calculated model instances that are associated with a plurality of the specific animal's: type, breed, age, and weight.

4. The method of claim 1, wherein the generating of the training set further comprises receiving the user feedback information regarding an animal action type and an animal action level to take for a sensed animal behavior pattern of the specific animal.

5. The method of claim 4, wherein the generating of the training set further comprises, to prepare an input record for the training set from sensor input data of the sensors, an operation of:
   automatically determining a start time from which to include the sensor input data in a training record conditioned upon the user not indicating the start time, by using at least one of the following operations:
   in each sensor input, searching back for a value which has a larger relative difference from its preceding value above a threshold;
   in each sensor input, searching back for an outlier value;
   taking a value with a largest difference from its preceding value conditioned upon no outlier being found;
   using the found value to delimit and specify the start time with regards to this sensor data;
   limiting the searching back to a time window; and
   selecting a time of an oldest extreme value in time windows across all the sensors as the start time for the training record.

6. The method of claim 5, wherein a different time length is used for each of the sensors.

7. The method of claim 6, wherein the generating of the training set further comprises, to prepare an input record for the training set from the input sensors data:

using, for each time length of a respective sensor of the sensors, a separate set of animal behavior MLMs.

8. The method of claim 4, wherein the generating of the training set further comprises, to prepare an input record for the training set from the sensor data, an operation selected from the group consisting of:
aggregating multiple readings of each sensor into a representative value;
using at least one of an aggregation and selection operation that is appropriate for each sensor;
including multiple values from a sensor in a generated training record;
applying feature extraction techniques for sensor data that includes multiple features;
removing records that contain outliers in one or more of their sensor record fields;
applying dimensionality reduction on the records of a training set to select a most efficient sub-set of dimensions to use for training; and
applying at least one of training set partitioning, sharding, and slicing technique to increase at least one of accuracy and resiliency of the animal behavior MLM.

9. The method of claim 4, wherein the user feedback information further comprises a classification of the sensed animal behavior pattern.

10. The method of claim 1, wherein validating of the animal behavior MLM further comprises:
providing predictions to the user based on the specific animal's behavior patterns.

11. The method of claim 1, wherein:
providing system generated classifications utilizes results of the animal behavior MLM;
the method further comprising:
using the animal behavior MLM to check readings of the sensors;
aggregating results of various types or instances of animal behavior MLMs;
performing a user action selected from the group consisting of maintaining, removing, and modifying any sub-set of animal behavior MLMs based on user input; and
notifying the user of entering the application phase.

12. The method of claim 1, wherein the animal training action is taken:
based on system predictions in the application phase.

13. The method of claim 1, wherein the user feedback information comprises a classification of an animal behavior pattern and associated requested animal training action.

14. The method of claim 1, wherein the animal behavior MLM comprises the neural network that contains algorithms and data to perform machine learning functionality.

15. The method of claim 1, where pre-existing training data is also used as a basis when generating the training set for the animal behavior MLM.

16. The method of claim 1, further comprising:
capturing a behavior pattern of the specific animal, wherein the user feedback information identifies how to classify the behavior pattern.

17. The method of claim 1, further comprising:
in a validation phase,
validating the animal behavior MLM by providing system generated classifications.

18. The method of claim 1, wherein the animal training action includes a training action type and a training action level of a training action device for the specific animal.

19. A computer program product for automatic animal behavior training, comprising:
a computer-readable storage medium having program instructions embodied thereon to perform steps of:
receiving user configuration information and user feedback information from a user regarding a specific animal;
receiving input from sensors for the specific animal;
determining a mapping between the input and a set of positive and negative training actions to apply for the specific animal;
in a generating phase:
generating a training set for an animal behavior machine learning model (MLM) based on sensed animal behavior patterns and the user feedback information;
in an MLM training phase:
training the animal behavior MLM based on the training set using back propagation that includes gradient descent to reduce an objective function by altering a set of weights and biases of the animal behavior MLM to increase accuracy of the animal behavior MLM, wherein the animal behavior MLM comprises a neural network;
in an application phase:
sensing, by the sensors associated with the specific animal, a behavior of the specific animal to produce a sensed behavior; and
conditioned upon the sensed behavior, providing an animal training action,
wherein the user configuration information and the user feedback information comprise:
specific animal name, type, breed, age, and weight;
which of the sensors to use for the specific animal;
which training devices to use for the specific animal;
a user mapping of training action types and training action levels for training action devices to corresponding behaviors of the specific animal; and
static definitions of specific sensor data mappings to specific training action types and specific training action levels.

20. A computer system for automatic animal behavior training, comprising:
a processor;
a computer-readable storage medium; and
program instructions stored on the computer-readable storage medium to cause the processor to perform operations comprising:
receiving user configuration information and user feedback information from a user regarding a specific animal;
receiving input from sensors for the specific animal;
determining a mapping between the input and a set of positive and negative training actions to apply for the specific animal;
in a generating phase:
generating a training set for an animal behavior machine learning model (MLM) based on sensed animal behavior patterns and the user feedback information;
in an MLM training phase:
training the animal behavior MLM based on the training set using back propagation that includes gradient descent to reduce an objective function by altering a set of weights and biases of the animal behavior MLM to increase accuracy of the animal behavior MLM, wherein the animal behavior MLM comprises a neural network;

in an application phase:
  sensing, by the sensors associated with the specific animal, a behavior of the specific animal to produce a sensed behavior; and
  conditioned upon the sensed behavior, providing an animal training action,
wherein the user configuration information and the user feedback information comprise:
  specific animal name, type, breed, age, and weight;
  which of the sensors to use for the specific animal;
  which training devices to use for the specific animal;
  a user mapping of training action types and training action levels for training action devices to corresponding behaviors of the specific animal; and
  static definitions of specific sensor data mappings to specific training action types and specific training action levels.

* * * * *